US010817899B2

(12) United States Patent
  Slain

(10) Patent No.: US 10,817,899 B2
(45) Date of Patent: Oct. 27, 2020

(54) METHODS AND SYSTEMS FOR MONITORING VIEWABLE IMPRESSIONS OF ONLINE CONTENT

(71) Applicant: Yahoo Holdings, Inc., Sunnyvale, CA (US)

(72) Inventor: Ilya Slain, Santa Clara, CA (US)

(73) Assignee: Oath Inc., New York, NY (US)

( * ) Notice: Subject to any disclaimer, the term of this patent is extended or adjusted under 35 U.S.C. 154(b) by 244 days.

(21) Appl. No.: 15/421,052

(22) Filed: Jan. 31, 2017

(65) Prior Publication Data

US 2018/0218391 A1    Aug. 2, 2018

(51) Int. Cl.
  *G06Q 30/02*    (2012.01)
(52) U.S. Cl.
  CPC ..... *G06Q 30/0246* (2013.01); *G06Q 30/0277* (2013.01)
(58) Field of Classification Search
  CPC .................. G06Q 30/0246; G06Q 30/0277
  USPC ...................................... 705/14.45
  See application file for complete search history.

(56) References Cited

U.S. PATENT DOCUMENTS

| | | | |
|---|---|---|---|
| 2015/0012352 A1* | 1/2015 | Kanter | G06Q 30/0246 705/14.45 |
| 2015/0379571 A1* | 12/2015 | Grbovic | G06Q 30/0256 705/14.54 |
| 2018/0040003 A1* | 2/2018 | Scharf | G06Q 30/0201 |
| 2018/0218391 A1* | 8/2018 | Slain | G06Q 30/0277 |

FOREIGN PATENT DOCUMENTS

KR     20030060372 A  *  7/2003

OTHER PUBLICATIONS

Adam Parikh, What Is Ad Viewability and how is it Affecting Your Ad Campaign's Performance, 2015 (Year: 2015).*

* cited by examiner

*Primary Examiner* — Tarek Elchanti
(74) *Attorney, Agent, or Firm* — Cooper Legal Group, LLC

(57) ABSTRACT

Methods and systems to monitor viewable impressions of online advertisements are provided. A method includes receiving a request to provide an online advertisement for display on a user device. The method further includes providing an online advertisement viewability rules array to an online content publisher system in response to receiving the request. The online advertisement viewability rules array includes a plurality of rules, each rule of the plurality of rules including a definition of when a viewable impression of an online advertisement occurs on a user device. The method further includes receiving, through operation of the online content publisher system, data indicating a viewable impression of the online advertisement has occurred on the user device. The data is generated in response to a determination a viewable impression of the online advertisement has occurred on the user device according to at least one rule of the online advertisement viewability rules array.

20 Claims, 8 Drawing Sheets

```
"rules": {
 "viewabilityDef" : [
   {
     "t" : 1, //viewability type 1
     "d" : 2, //minimum video duration: 2 sec
     "c" : 1, //consecutive playback required?: yes
     "p" : 50, //minimum pixels %: 50%
     "a" : 0, // audio ON required?: no
   },
   {
     "t" : 2, //viewability type 2
     "d" : 15, //minimum duration: 15 sec
     "c" : 0, //consecutive playback required?: no
     "p" : 100, //minimum pixels %: 100%
     "a" : 1, //audio ON required?: yes
   }
 ]
}
```

Fig. 6

METHODS AND SYSTEMS FOR MONITORING VIEWABLE IMPRESSIONS OF ONLINE CONTENT

BACKGROUND

This application relates generally to data processing systems. More particularly, this application relates to methods and systems for monitoring viewable impressions of online content.

Online advertising has become increasingly popular as a way for advertisers to publicize information about goods and services to potential customers and clients. An advertiser can implement an advertising campaign using internet-accessible facilities of online advertisement platforms, for example Yahoo! GEMINI. The online advertisement platform serves to connect the advertiser with users accessing online resources such as search engines and news and information sites. Advertisements ("ads") of the advertiser are provided to the users to inform and attract the attention of the users.

An online advertising platform places advertisements of advertisers within content services made available to end users, for example web pages, mobile applications ("apps"), TV apps, or other audio or visual content services. The advertisements are provided along with other content. The other content may include any combination of text, graphics, audio, video, or links to such content. The advertisements are conventionally selected based on a variety of criteria including those specified by the advertiser. The advertiser conventionally defines an advertising campaign to control how and when advertisements are made available to users and to specify the content of those advertisements. The content of the advertisements themselves is sometimes referred to as advertising creative or advertising creatives.

Various monetization techniques or models may be used in connection with sponsored advertising. In an auction-type online advertising marketplace, advertisers may bid in connection with placement of advertisements, although other factors may also be included in determining advertisement selection or ranking. Bids may be associated with amounts advertisers pay for certain specified occurrences, such as for placed or clicked-on advertisements, for example. Advertiser payment for online advertising may be divided between parties including one or more publishers or publisher networks, one or more marketplace facilitators or providers, or potentially among other parties.

In order for an online advertisement to inform and attract the attention of a user, it may be important that the online advertisement is viewed by the user to whom it was provided. Further, in some monetization techniques or models, a publisher is only paid for having an online advertisement displayed with its online content if the online advertisement was viewable to the user to which the online advertisement was provided. For at least these reasons, publishers of online content generally send a viewable impression beacon to the online advertising platform that provided the online advertisement when aspects of the display of the online advertisement meet various viewability conditions. However, current methods and systems for configuring how publishers determine whether a viewable impression of an online advertisement has occurred can be improved upon.

BRIEF SUMMARY

To monitor viewable impressions of online advertisements and report viewable impressions back to the online advertising platform that provided the online advertisements, the publisher system should be configured in some manner to perform the monitoring and reporting. For example, an operator of the publisher system may embed its own code on publisher pages or mobile applications. The code may be embedded through the use of JAVASCRIPT libraries or software development kits (SDKs). In a second manner of configuring the publisher system, the operator of the online advertising platform may enter an agreement with the operator of the publisher system, according to which the publisher system will implement monitoring and reporting in a manner consistent with pre-defined viewability rules. In a third manner of configuring the publisher system, the operator of the online advertising platform may enter an agreement with the operator of the publisher system, according to which the publisher system will implement monitoring and reporting in a manner consistent with viewability rules that are received by the publisher when the given online advertisement is served by the online advertising platform.

This conventional technology presents a number of technical problems. For example, in the first and second manners of configuring the publisher system, the publisher monitors and reports viewable impressions by implementing code or rules that are effectively fixed until the operator of the publisher system modifies the publisher system to include new code or rules. This makes it difficult for other interested parties, for example the operator of the online advertising platform or an advertiser whose online advertisements are being displayed, to modify the manner in which viewable impressions of online advertisements are monitored and reported. Additionally, it requires that the operator of the publisher system expend time and effort to implement the modifications. Aspects of this disclosure provide one or more technical solutions to one or more of these technical problems.

A first aspect of the present disclosure provides a computer-implemented method to monitor viewable impressions of online advertisements. The method includes, in a server of an online advertising platform system, receiving a request to provide an online advertisement for display on a user device. The method further includes, in a server of the online advertising platform system, providing an online advertisement viewability rules array to an online content publisher system in response to receiving the request. The online advertisement viewability rules array includes a plurality of rules, wherein each rule of the plurality of rules includes a definition of when a viewable impression of an online advertisement occurs on a user device. The method further includes, in a server of the online advertising platform system, receiving, through operation of the online content publisher system, data indicating that a viewable impression of the online advertisement has occurred on the user device. The data is generated by a processor of the user device in response to a determination by the processor of the user device that a viewable impression of the online advertisement has occurred on the user device according to at least one rule of the online advertisement viewability rules array.

A second aspect of the present disclosure provides a non-transitory processor-readable medium storing instructions to monitor viewable impressions of online advertisements. The instructions are configured to, when executed by a processor of a server of an online advertising platform system, cause the processor to perform an operation of receiving a request to provide an online advertisement for display on a user device. The instructions are further configured to, when executed by a processor of a server of an online advertising platform system, cause the processor to perform an operation of providing an online advertisement viewability rules array to an online content publisher system in response to receiving the request. The online advertisement viewability rules array includes a plurality of rules, wherein each rule of the plurality of rules includes a definition of when a viewable impression of an online advertisement occurs on a user device. The instructions are further configured to, when executed by a processor of a server of an online advertising platform system, cause the processor to perform an operation of receiving, through operation of the online content publisher system, data indicating that a viewable impression of the online advertisement has occurred on the user device receiving. The data is generated by a processor of the user device in response to a determination by the processor of the user device that a viewable impression of the online advertisement has occurred on the user device according to at least one rule of the online advertisement viewability rules array.

A third aspect of the present disclosure provides an online advertising platform server to monitor viewable impressions of online advertisements. The online advertising platform server includes a processor-readable medium storing first instructions to monitor online advertisement viewability. The online advertising platform server further includes a processor in operative communication with the processor-readable medium. The processor is configured to execute the instructions to perform an operation of receiving a request to provide an online advertisement for display on a user device. The processor is further configured to execute the instructions to perform an operation of providing an online advertisement viewability rules array to an online content publisher system in response to receiving the request. The online advertisement viewability rules array includes a plurality of rules, wherein each rule of the plurality of rules includes a definition of when a viewable impression of an online advertisement occurs on a user device. The processor is configured to execute the instructions to perform an operation of receiving, through operation of the online content publisher system, data indicating that a viewable impression of the online advertisement has occurred on the user device. The data is generated by a processor of the user device in response to a determination by the processor of the user device that a viewable impression of the online advertisement has occurred on the user device according to at least one rule of the online advertisement viewability rules array.

These and other advantages, aspects, and novel features of the present disclosure, as well as details of illustrated embodiments thereof, will be more fully understood from the following description and drawings.

BRIEF DESCRIPTION OF THE DRAWINGS

FIG. 6 is a schematic diagram illustrating an exemplary script representing an exemplary viewability rules array;

DETAILED DESCRIPTION

Figure 1:
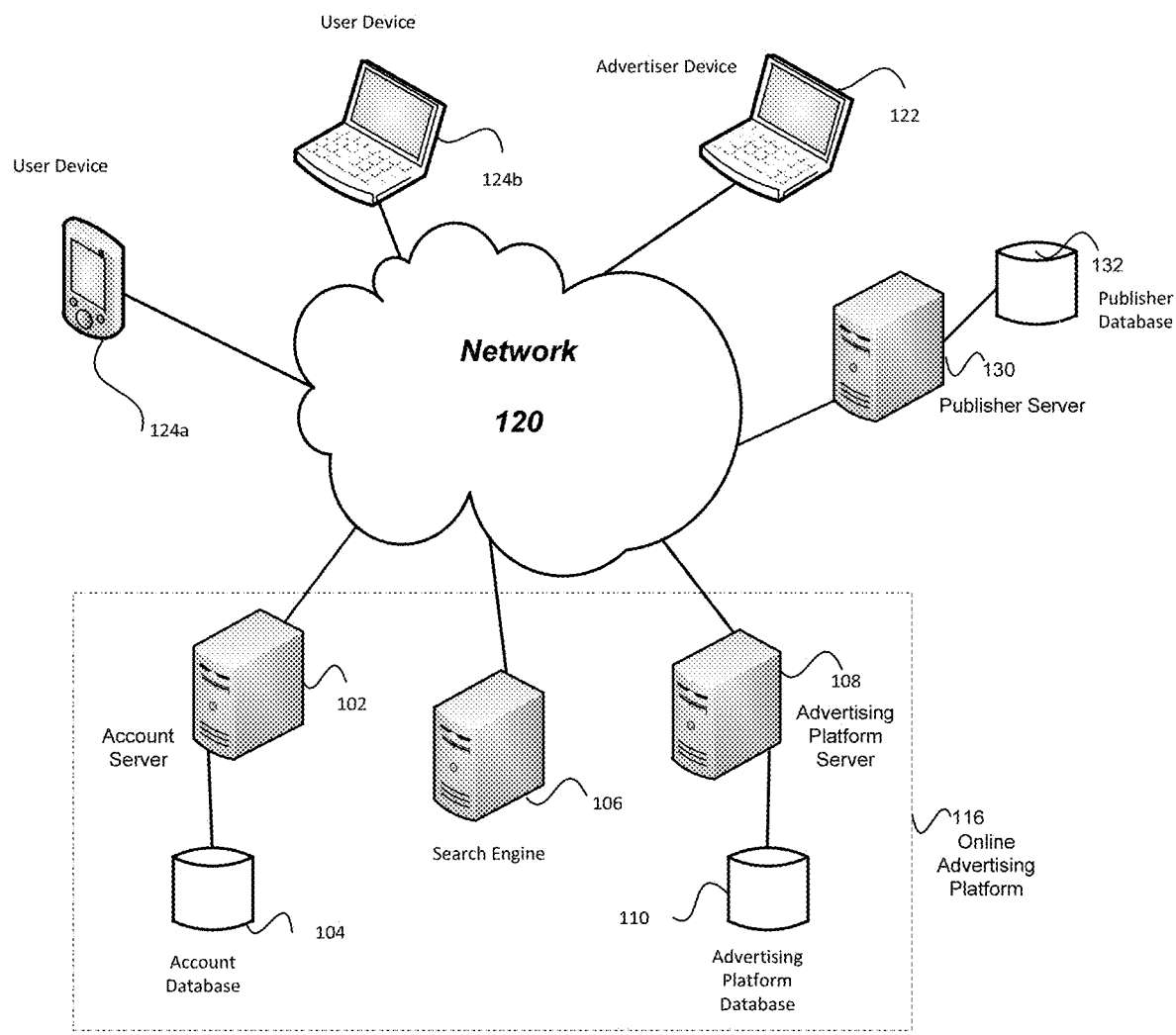
FIG. 1 is a schematic diagram illustrating an exemplary online information environment.

The present disclosure provides one or more solution to one or more problems presented by current technologies for monitoring viewable impressions. As explained in the following detailed description, aspects of the present disclosure receive a request to provide an online advertisement for display on a user device, provide an online advertisement viewability rules array to an online content publisher system in response to receiving the request, and receive, through operation of the online content publisher system, data indicating that a viewable impression of the online advertisement has occurred on the user device. The online advertisement viewability rules array includes a plurality of rules, wherein each rule of the plurality of rules includes a definition of when a viewable impression of an online advertisement occurs on a user device. The data is generated by a processor of the user device in response to a determination by the processor of the user device that a viewable impression of the online advertisement has occurred on the user device according to at least one rule of the online advertisement viewability rules array. These aspects improve upon current technologies, for example because they allow for parties other than the operator of the online content publisher system, for example an operator of the online advertising platform system providing the online advertisement, or an advertiser whose advertisement is being provided, to dynamically add new viewability types and dynamically change viewability rules, without the publisher needing to make changes to the code or rules on the publisher system that is currently being implemented by the publisher to monitor and report viewable impressions.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the terms "based on" or "based upon" may be understood as not necessarily being intended to convey an exclusive set of factors and may, instead, allow for existence of additional factors not necessarily expressly described, again, depending at least in part on context.

FIG. 1 is a schematic diagram of an exemplary online information environment 100. Online information environment 100 may include online advertising platform 116, network 120, user device 124a, 124b, advertiser device 122, publisher server 130, and publisher database 132.

Online advertising platform 116 may be accessible over network 120 by one or more advertiser devices, for example advertiser device 122, and by one or more user devices, for example user device 124a, 124b. Advertisers may provide advertisements to online advertising platform 116 over network 120. Users may access content from sources over network 120 with one or more user devices, for example user device 124a, 124b. Online advertising platform 116 may place advertisements in or with the accessed content over network 120 so the advertisements may be accessed by user device 124a, 124b. In one example, online advertising platform 116 may be deployed and operated by an online provider, for example Yahoo! Inc. Online advertising platform 116 may include account server 102, account database 104, search engine 106, advertising platform server 108, and advertising platform database 110.

Account server 102 may store account information for advertisers. Account server 102 may be in data communication with account database 104. Account information may include one or more database records associated with each respective advertiser. Any suitable information may be stored, maintained, updated and read from account database 104 by account server 102. Examples include advertiser identification information, advertiser security information, for example passwords and other security credentials, and account balance information. In some embodiments, an online provider which manages online advertising platform 116 may assign one or more account managers to a respective advertiser, and information about the one or more account managers may be maintained in account database 104 as well as information obtained and recorded for subsequent access by an account manager.

Account server 102 may be implemented using any suitable device. For example, account server 102 may be implemented as a single server, a plurality of servers, or any other type of computing device known in the art. Access to account server 102 may be accomplished through a firewall, not shown, which protects the account management programs and the account information from external tampering. Additional security may be provided via enhancements to the standard communications protocols, for example Secure HTTP or the Secure Sockets Layer.

Account server 102 may provide an advertiser front end to simplify the process of accessing the account information of an advertiser. The advertiser front end may be a program, application or software routine that forms a user interface. According to example embodiments of the present disclosure, the advertiser front end may be accessible as a web site with one or more web pages that an accessing advertiser may view on an advertiser device, for example advertiser device 122. The advertiser may view and edit account data using the advertiser front end. After editing the advertising data, the account data may then be saved to account database 104.

Search engine 106 may be a computer system, one or more servers, or any other computing device known in the art. Alternatively, search engine 106 may be a computer program, instructions, or software code stored on a computer-readable storage medium that runs on a processor of a single server, a plurality of servers, or any other type of computing device known in the art. Search engine 106 may be accessed by user devices, for example user device 124a, 124b, operated by a user over network 120. User device 124a, 124b may communicate a user query to search engine 106. Search engine 106 may locate matching information using any suitable protocol or algorithm and return information to user device 124a, 124b. Search engine 106 may be designed to help users find information located on the Internet or an intranet, including for example information provided by publisher server 130 and stored in publisher database 132. According to exemplary embodiments of the present disclosure, search engine 106 may provide to user device 124a, 124b, over network 120, a web page with content including search results, information matching the context of a user inquiry, links to other network destinations or information, and files of information of interest to a user operating user device 124a, 124b.

Search engine 106 may enable a device, for example user device 124a, 124b, or any other client device, to search for files of interest using a search query. Typically, search engine 106 may be accessed by a client device via one or more servers or directly over network 120. Search engine 106 may, for example, comprise a crawler component, an indexer component, an index storage component, a search component, a ranking component, a cache, a profile storage component, a logon component, a profile builder, and one or more application program interfaces (APIs). Search engine 106 may be deployed in a distributed manner, for example via a set of distributed servers. Components may be duplicated within a network, for example for redundancy or better access.

Advertising platform server 108 may operate to serve advertisements to user devices, for example user device 124a, 124b. Advertisements include data defining advertisement information that may be of interest to a user of a user device. An advertisement may include text data, graphic data, image data, video data, or audio data. An advertisement may further include data defining one or more links to other network resources providing such data. The other locations may be other locations on the internet, other locations on an intranet operated by the advertiser, or other accessible locations. Advertisements or components of advertisements served by advertising platform server 108 may be stored in advertising platform database 110.

Advertisements may be displayed on web pages resulting from a user-defined search based at least in part upon one or more search terms, which may have been searched for using search engine 106. Advertisements may also be displayed based on content of an application or webpage that the user opens with a user device, for example user device 124a, 124b. The content may for example be provided by publisher server 130 and stored in publisher database 132. Advertising may be beneficial to users, advertisers, or web portals if displayed advertisements are relevant to interests of one or more users.

Advertising platform server 108 may include logic and data operative to format the advertisement data for communication to the user device. Advertising platform server 108 may be in data communication with advertising platform database 110. Advertising platform database 110 may store information to be utilized by online advertising platform 116, including data defining advertisements to be served to user devices. This advertisement data may be stored in platform database 110 by another data processing device or by an advertiser.

Further, advertising platform server 108 may be in data communication with network 120. Advertising platform server 108 may communicate ad data and other information to devices over network 120. This information may include advertisement data communicated to a user device. This information may also include advertisement data and other information communicated with an advertiser device, for example advertiser device 122. An advertiser operating an advertiser device 122 may access advertising platform server 108 over network 120 to access information including advertisement data. This access may include developing advertisement creatives, editing advertisement data, deleting advertisement data and other activities.

Advertising platform server 108 may provide an advertiser front end to simplify the process of accessing the advertising data of an advertiser. The advertiser front end may be a program, application or software routine that forms a user interface. In one particular embodiment, the advertiser front end is accessible as a web site with one or more web pages that an accessing advertiser may view on the advertiser device. The advertiser may view and edit advertising data using the advertiser front end. After editing the advertising data, the advertising data may then be saved to advertising platform database 110 for subsequent communication in advertisements to a user device.

Account server 102, search engine 106, and advertising platform server 108, may be implemented as any suitable computing device. A suitable computing device may be a computer system, one or more servers, or any other computing device known in the art. A computing device may be capable of sending or receiving signals, for example via a wired or wireless network, or may be capable of processing or storing signals, for example in memory as physical memory states, and may, therefore, operate as a server. Thus, devices capable of operating as a server may include, as examples, dedicated rack-mounted servers, desktop computers, laptop computers, set top boxes, integrated devices combining various features, for example two or more features of the foregoing devices, or the like. Alternatively, a server may be a computer program, instructions and/or software code stored on a computer-readable storage medium that runs on a processor of a single server, a plurality of servers, or any other type of computing device known in the art.

Network 120 may include any data communication network or combination of networks. A network may couple devices so that communications may be exchanged, for example between a server and a client device or other types of devices, including between wireless devices coupled via a wireless network, for example. A network may also include mass storage, for example network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks may employ differing architectures, may be compliant or compatible with differing protocols, or may interoperate within a larger network, for example network 120. Various types of devices may, for example, be made available to provide an interoperable capability for differing architectures or protocols. As one illustrative example, a router may provide a link between otherwise separate and independent LANs. A communication link or channel may include, for example, analog telephone lines, for example a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, for example via a telephone line or link.

Advertiser device 122 may include any data processing device which may access online advertising platform 116 over network 120. Advertiser device 122 may be operative to interact over network 120 with account server 102, search engine 106, the advertising platform server 108, content servers, for example publisher server 130, and other data processing systems, for example third-party analytics server 130. Advertiser device 122 may, for example, implement a web browser for viewing web pages and submitting user requests. Advertiser device 122 may communicate data to online advertising platform 116, including data defining web pages and other information. Advertiser device 122 may receive communications from online advertising platform 116, including data defining web pages and advertising creatives.

User device 124a, 124b may include any data processing device which may access other components of online information environment 100 over network 120. User device 124a, 124b may be operative to interact over network 120 with search engine 106. User device 124a, 124b may, for example, implement a web browser for viewing web pages and submitting user requests. A user operating user device 124a, 124b may enter a search request and communicate the search request to online advertising platform 116. The search request may be processed by search engine 106 and search results may be returned to user device 124a, 124b. In other examples, a user of user device 124a, 124b may request data, for example a page of information from one or more components of online information environment 100, including for example publisher server 130 or online advertising platform 116. The data may be provided in a computer application, a native mobile application, a TV application, or an audio application. One or more components of online information environment 100 may provide the data or redirect the browser to another web site. In addition, advertising platform server 108 may select advertisements from platform database 110 and include data defining the advertisements in the provided data to user device 124a, 124b.

Advertiser device 122 and user device 124a, 124b may each operate as a client device when accessing information in online information environment 100. A client device, for example advertiser device 122 and user device 124a, 124b, may include a computing device capable of sending or receiving signals, for example via a wired or a wireless network. A client device may, for example, include a desktop computer or a portable device, for example a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, for example features of the forgoing devices, or the like. In the example of FIG. 1, laptop computer 124b and smartphone 124a may be operated interchangeably as an advertiser device or as a user device depending upon the context.

Publisher server 130, publisher database 132, or a combination of publisher server 130 and publisher database 132 may be components of or form a publisher system. Publisher systems may be configured to server a variety of content. In some embodiments, a publisher system may be operated separately from online advertising platform 116. For example, online advertising platform 116 may be Yahoo! GEMINI, and publisher server 130 and publisher database 132 may be controlled by a third-party publisher. In other embodiments, a publisher system and online advertising platform 116 may be under common control. For example, online advertising platform may be Yahoo! GEMINI, and publisher server 130 and publisher database 132 may be components of a publisher that is controlled by Yahoo! Inc.

Figure 2:
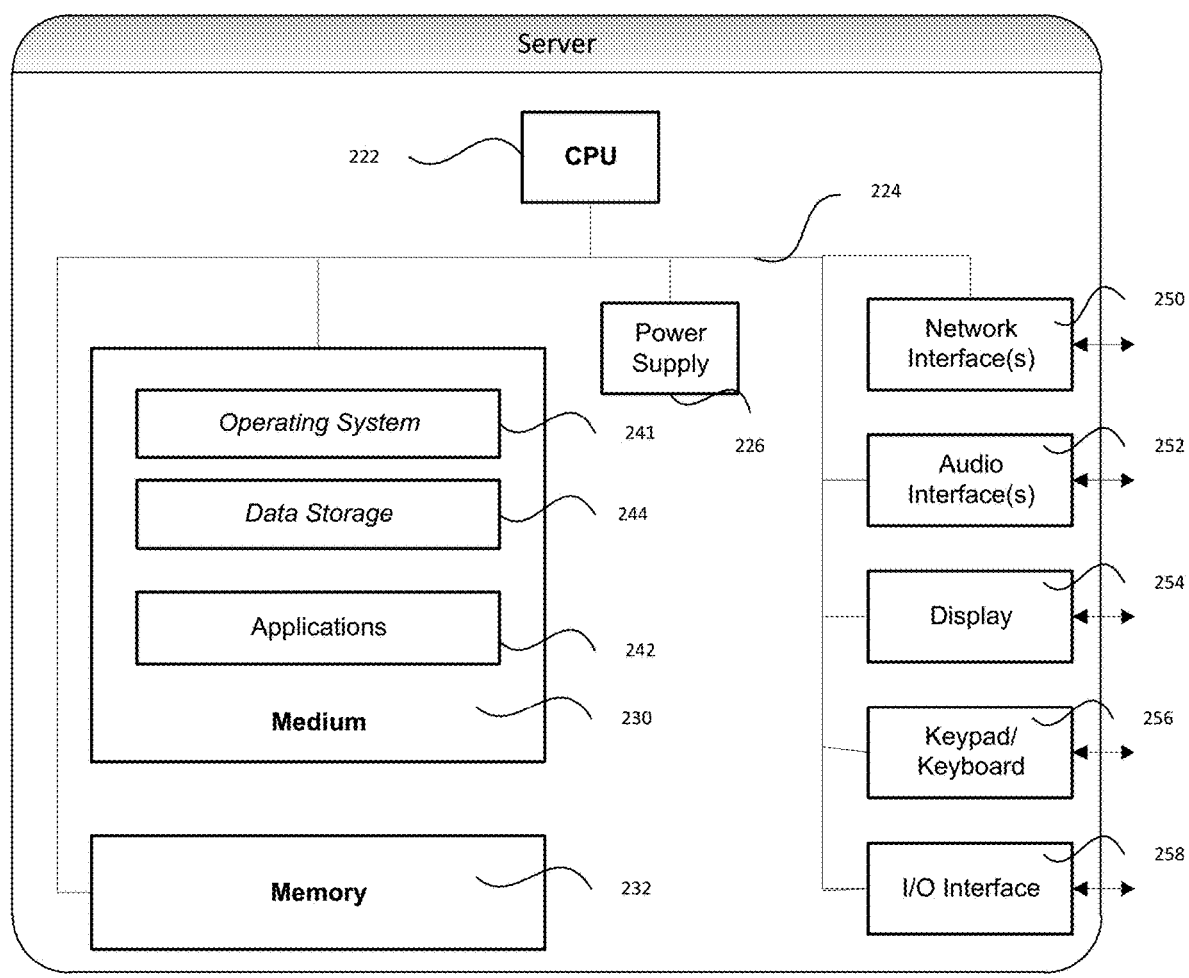
FIG. 2 is a schematic diagram illustrating an exemplary server.

FIG. 2 is a schematic diagram illustrating an exemplary server. Server 200 may be used as account server 102, search engine 106, advertising platform server 108, and publisher server 130 of FIG. 1. Server 200 may vary widely in configuration or capabilities, but it may include one or more central processing units 222 and memory 232, one or more media 230 (for example one or more mass storage devices) storing application programs 242 or data 244, one or more power supplies 226, one or more wired or wireless network interfaces 250, one or more audio interfaces 252, one or more displays 254, one or more keypads/keyboards 256, one or more input/output interfaces 258, and/or one or more operating systems 241, for example Windows Server™, Mac OS X™, Unix™, Linux™, FreeBSD™, or the like. The components of server 200 may be communicatively connected by a bus 224. The media 230 may store sets of instructions, or units and/or modules that include the sets of instructions, for conducting operations and/or method steps described in the present disclosure. Alternatively, the units and/or modules may be hardware disposed in the server 200 configured to conduct operations and/or method steps described in the present disclosure. The one or more processors may be configured to execute the sets of instructions and perform the operations in example embodiments of the present disclosure.

Thus server 200 may include, as examples, dedicated rack-mounted servers, desktop computers, laptop computers, set top boxes, mobile computational devices, for example smart phones, integrated devices combining various features, for example two or more features of the foregoing devices, or the like.

Account server 102, search engine 106, advertising platform server 108, and publisher server 130 illustrated in FIG. 1 may be implemented as content servers or may be in communication with content servers. A content server may include a device that includes a configuration to provide content via a network to another device. A content server may, for example, host a site, for example a social networking site, examples of which may include, but are not limited to, Flicker™ Twitter™, Facebook™, LinkedIn™, or a personal user site (for example a blog, vlog, online dating site, etc.). A content server may also host a variety of other sites, including, but not limited to business sites, educational sites, dictionary sites, encyclopedia sites, wikis, financial sites, government sites, etc. A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, for example electrical signals, for example, or may be stored in memory, as physical states, for example. Examples of devices that may operate as a content server include desktop computers, multiprocessor systems, microprocessor-type or programmable consumer electronics, etc. The content servers may not be under common ownership or control with the ad server or servers. Publisher server 130 is a content server controlled by a publisher, and may serve content stored on publisher database 132.

Figure 3:
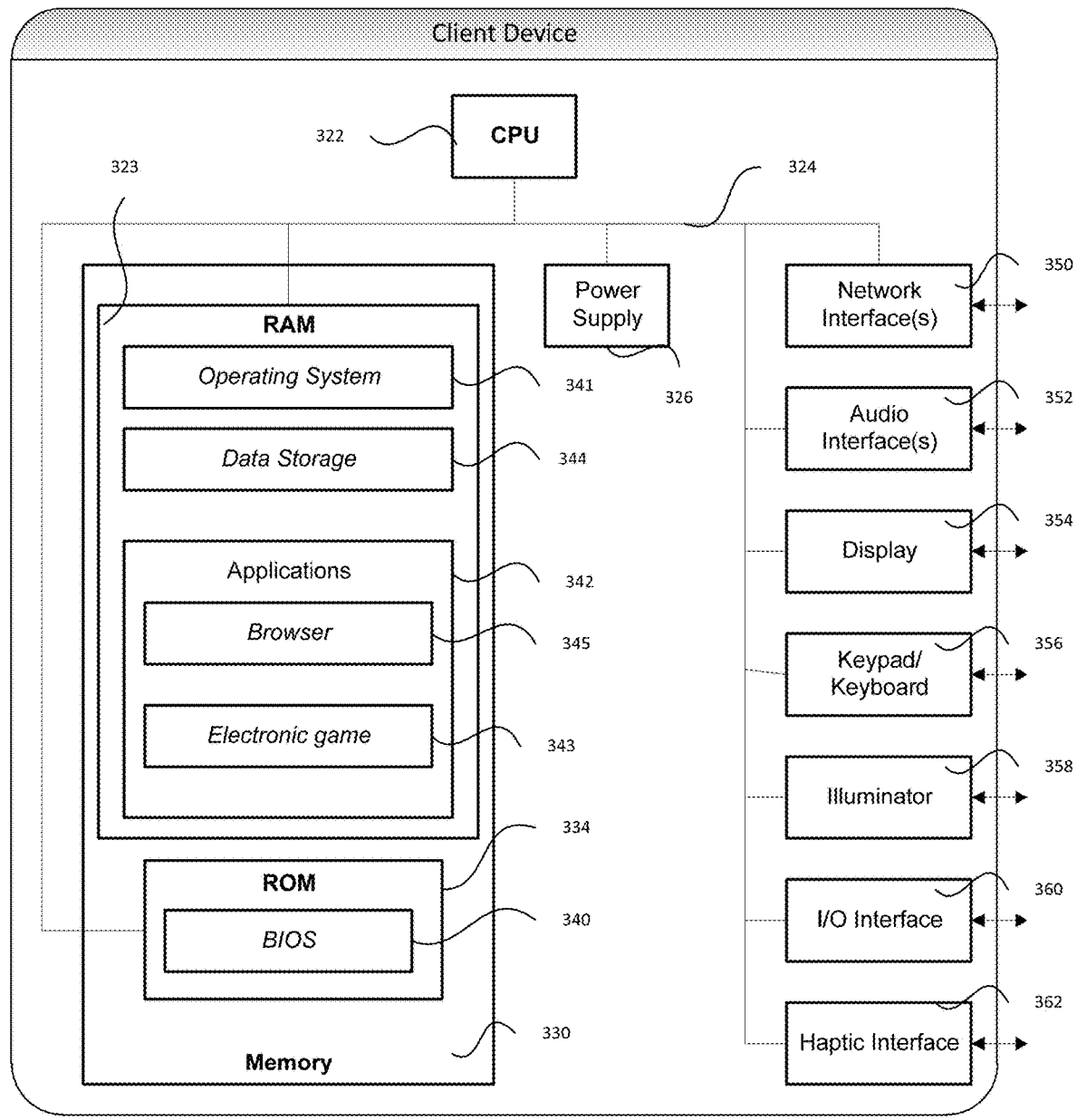
FIG. 3 is a schematic diagram illustrating an exemplary client device.

FIG. 3 is a schematic diagram illustrating an exemplary client device. Client device 300 may be used as user device 124a, 124b and advertiser device 122. A client device may include apparatuses to execute methods and software systems introduced in the present disclosure. Client device 300 may be a computing device capable of executing a software system. Client device 300 may, for example, be a personal desktop computer or a portable device, for example a laptop computer, a tablet computer, a cellular telephone, or a smart phone.

Client device 300 may vary in terms of capabilities or features. Claimed subject matter is intended to cover a wide range of potential variations. Client device 300 may include one or more non-transitory processor-readable storage media 330 and one or more processors 322 in communication with the non-transitory processor-readable storage media 330. For example, the non-transitory processor-readable storage media 330 may be a RAM memory 323, flash memory, ROM memory 334, EPROM memory, EEPROM memory, registers, hard disk, a removable disk, a CD-ROM, or any other form of non-transitory storage medium known in the art. The one or more non-transitory processor-readable storage media 330 may store sets of instructions, or units and/or modules that include the sets of instructions, for conducting operations and/or method steps described in the present disclosure. Alternatively, the units and/or modules may be hardware disposed in the client device 300 configured to conduct operations and/or method steps described in the present disclosure. The one or more processors may be configured to execute the sets of instructions and perform the operations in example embodiments of the present disclosure.

Client device 300 may include or execute a variety of operating systems 341, including an operating system, for example Windows™ or Linux™, or a mobile operating system, for example iOS™, Android™, or Windows Mobile™, which may be stored in RAM memory 323. Client device 300 may include or may execute a variety of possible applications 342, for example an electronic game 343 and a browser 345. A network interface 350 and an application 342 may enable communication with other devices via a network, for example communicating with another computer, another client device, or server via a network. Client device 300 may include an I/O interface 360, and may include or execute BIOS 340 which may be a set of firmware instructions stored in ROM 340 that control input and output operations of client device 300 via I/O interface 360.

Client device 300 may include a variety of input and output components. Client device 300 may include keypad/keyboard 356. Client device 300 may include a display 354, for example a liquid crystal display (LCD), or a display with a high degree of functionality, for example a touch-sensitive color 2D or 3D display, and an illuminator 358. In contrast, however, as another example, a web-enabled client device 300 may include one or more physical or virtual keyboards. Client device 300 may include audio interface(s) 352. Client device 300 may include haptic interface 362. Client device may include power supply 326 to power one or more of the components of client device 300, and bus 324 to communicatively connect one or more components of client device 300 with each other.

Merely for illustration, only one processor may be described in client devices and servers that execute operations and/or method steps in the following example embodiments. However, it should be noted that the client devices and servers in the present disclosure may also include multiple processors, thus operations and/or method steps that are performed by one processor as described in the present disclosure may also be jointly or separately performed by the multiple processors. For example, if in the present disclosure a processor executes both step A and step B, it should be understood that step A and step B may also be performed by two different processors jointly or separately in the client device (e.g., the first processor executes step A and the second processor executes step B, or the first and second processors jointly execute steps A and B). Furthermore, the term "processor" may include more than one processor.

Figure 4:
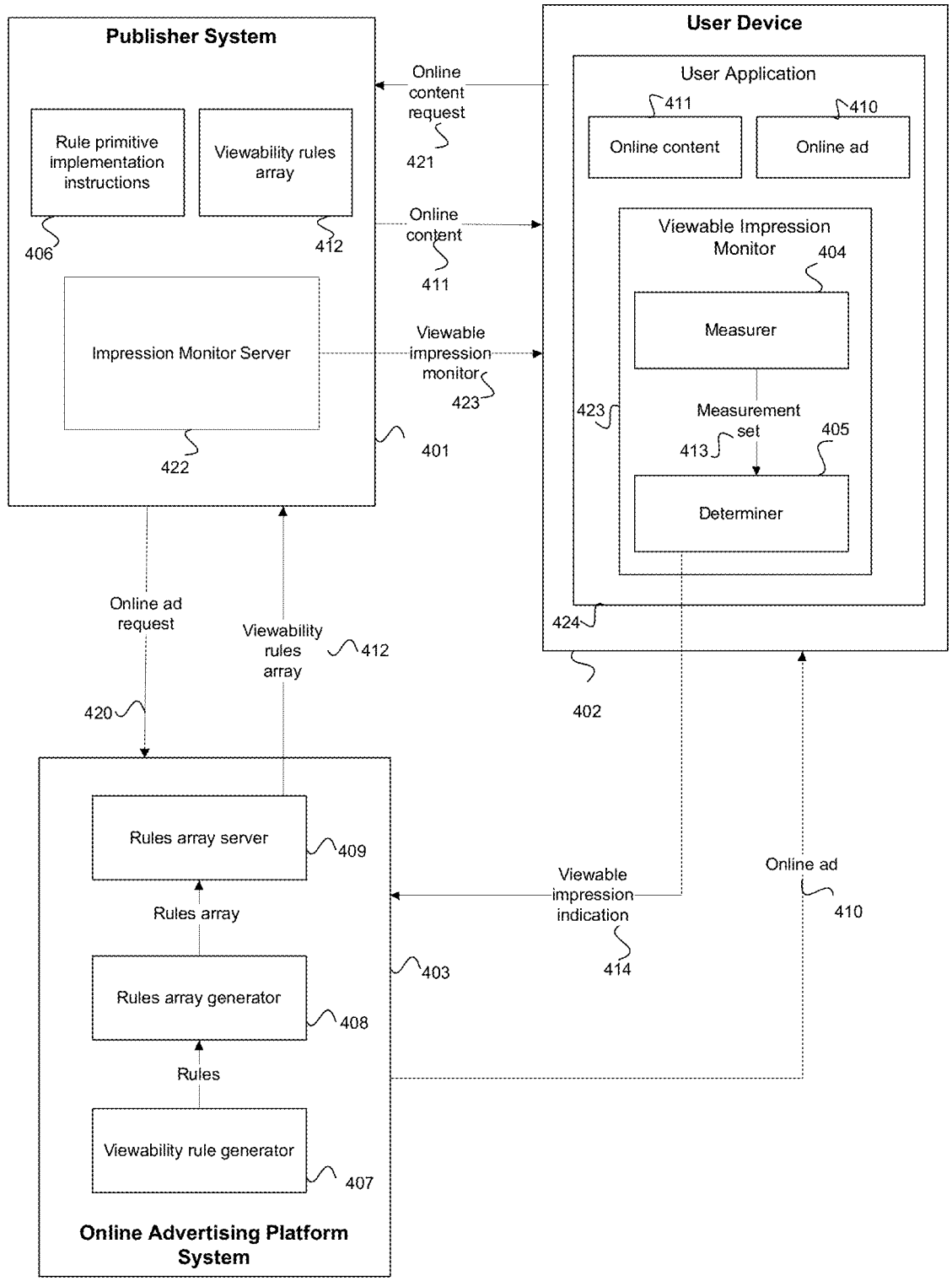
FIG. 4 is a schematic diagram illustrating an exemplary method and components for monitoring viewable impressions of online advertisements.

FIG. 4 is a schematic diagram illustrating an exemplary method and components for monitoring viewable impressions of online advertisements. The exemplary method may include publisher system 401, user device 402, and online advertising platform system 403. Publisher system 401 may for example be implemented as publisher server 130, or as publisher server 130 and publisher database 132. Publisher system 401 may include rule primitive implementation instructions 406 and impression monitor server 422. User device 402 may include user application 424, and may for example be implemented as user device 124a, 124b. User application 424 may generally be an application that can display online content and an online ad, for example a browser or a mobile application. Online advertising platform system 403 may for example be implemented as online advertising platform 116 or one or more components of online advertising platform 116, for example advertising platform server 108, or advertising platform server 108 and advertising platform database 110. Online advertising platform system 403 may include viewability rule generator 407, rules array generator 408, and rules array server 409.

In the exemplary method of FIG. 4, publisher system 401 sends an ad request 420 to online advertising platform system 403 to request that an online advertisement, for example online advertisement 410, be provided for placement with online content 411 and for display by user device 402. Publisher system 401 may for example send ad request 420 in response to receiving online content request 421 from user device 402. In response to ad request 420, online advertising platform system 403 provides online advertisement 410 for placement with online content 411 and for display by user device 402. For example, user device 402 may display online advertisement 410 with online content 411 in association with its execution of user application 424. Online advertising platform system 403 may provide online advertisement 410 to user device 402 directly, for example by serving online advertisement 410 directly to user device 402, or indirectly, for example by serving online advertisement 410 to publisher system 401, which then serves online advertisement 410 to user device 402. In response to ad request 420, online advertising platform system 403 also provides viewability rules array 412 to publisher system 401. A viewability rules array, for example viewability rules array 412, has as its elements a plurality of rules that each define when a respective type of viewable impression of an online advertisement has occurred on a user device. Exemplary rules may for example describe an INTERNATIONAL ADVERTISING BUREAU (IAB) viewable impression and a GROUPM viewable impression. However any suitable rule describing viewability could be used in the scope of the present description, including existing and yet to be developed rules that describe viewability.

Each rule may include a condition set that defines when a viewable impression of an online advertisement has occurred on a user device according to the rule. A condition set may include one or more conditions that must be met in a display of an online advertisement for that condition set to be satisfied and for that display of the online advertisement to be determined to be a viewable impression of the online advertisement according to the rule. A condition may for example be a threshold value to be met for an aspect of the display of the online advertisement on the user device. Such a threshold value may be a numerical value of an aspect of a display of an online advertisement by a user device, a state of a user device, or other suitable values which when met are indicative that a display of an online advertisement on a user device is a viewable impression. A threshold value may be considered to have been met when the threshold value itself has been attained or exceeded in the display of the online advertisement by the user device. When a condition is that a value of an aspect is required be less than or equal to a threshold value, that threshold value may be considered to have been exceeded when a value less than the threshold value has been attained. In some embodiments, a definition of a condition may include expressions, operators, and other definition language constructs. Exemplary conditions for online video advertisements include: a required minimum duration of display of an advertisement; a required minimum percentage of pixels displayed of an advertisement; a requirement for consecutive playback of an advertisement; or a requirement that audio of a user device is on during display of an advertisement. However a variety of other conditions may be included in a rule, depending for example on the type of online advertisement that the rule is intended to be served with. For example, conditions included in a rule intended to be served with an online banner ad may be entirely different from, or have some overlap with, conditions included in rules for an online native ad or an online video ad.

Each rule may further include one or more exclusions that do not need to be met in a display of an online advertisement for that display of the online advertisement to be determined to be a viewable impression of the online advertisement according to the rule. An exclusion may be an aspect of a display of an online advertisement on a user device for which a particular value is not required to be met for that display of the online advertisement to be determined to be a viewable impression of the online advertisement according to the rule. Exemplary exclusions for online video advertisements include: audio of a user device is not required to be on during display of an advertisement; or consecutive playback of an advertisement is not required. However a variety of other exclusions may be included in a rule, depending for example on the type of online advertisement that the rule is intended to be served with. For example, exclusions included in a rule intended to be served with an online banner ad may be entirely different from, or have some overlap with, exclusions included in rules for an online native ad or an online video ad.

Each rule may further include a viewability-type identifier that describes which predetermined type of viewable impression has occurred when, according to that rule, a display of an online advertisement on a user device matches the rule's definition of when a respective viewable impression of an online advertisement has occurred on a user device. A viewability-type identifier may be a name of a viewable impression type, or information representative of such a name. For example, a viewability-type identifier may be the name "Yahoo! GEMINI," or a unique identifier that represents Yahoo! GEMINI to an online advertising platform system and publisher system.

A viewability rules array may be implemented as processor-readable code, script, instructions, etc. FIG. 6 is a schematic diagram illustrating an exemplary script 600. Exemplary script 600 represents an exemplary viewability rules array for an online video advertisement. Exemplary script 600 includes two different rules for two respective viewable impression types. In exemplary script 600: t is viewability-type, with values 1 and 2 being viewability-type identifiers respectively representing two distinct viewability-types; d is minimum video duration, with 2 and 15 being respective threshold values, in seconds, of that aspect; c is consecutive playback existence, with 0 being a value setting consecutive playback existence to be an exclusion, and 1 being a value setting consecutive playback existence as a condition with a threshold value of 'yes'; p is minimum percentage of pixels, with 50 and 100 being respective threshold values, in percentages, of that aspect; and a is audio-on state, with 0 being a value setting that aspect to be an exclusion, and 1 being a value setting that aspect to be a condition with a threshold value of 'yes'. Exemplary script 600 is depicted to illustrate various features of viewability rules arrays, and viewability rules arrays can be implemented in a variety of other forms and with a variety of other contents as is suitable in the art.

Using online advertising platform system 403 to provide viewability rules arrays to publisher system 401 as part of the response by online advertising platform system 403 to ad request 420 provides a number of benefits over current methods and systems for configuring publisher systems to monitor viewable impressions of online advertisements. For example, it allows online advertising platform 403 to dynamically customize both the types of viewable impressions that are monitored for a given online advertisement and the manner in which viewable impressions are determined to have occurred. Viewability rule generator 407 may be used to define rules that are provided by online advertising platform system 403. Viewability rule generator 407 may be configured to receive, from an operator of online advertising platform system 403, input that defines rules for inclusion in viewability rules arrays served by online advertising platform system 403. Input from an operator of online advertising platform system 403 may for example be entered through one or more components of online advertising platform system 403. Alternatively or additionally, rule generator 407 may be configured to receive input from an advertiser, for example through an advertiser device such as advertiser device 122. For example, an advertiser may use advertiser device 122 to communicate with account server 102 and/or advertising platform server 108 in order to define rules for inclusion in viewability rules arrays to be served with online advertisements of the advertiser.

Rule generator 407 may be configured to utilize such input to change existing rule definitions already being served by online advertising platform system 403, and to add new rule definitions to be served by online advertising platform system 403. Rule generator 407 may be configured to utilize such input to specify particular online advertisements or classes of online advertisements along with which a new or changed rule should be served by online advertising platform 403. Rule generator 407 may be configured to utilize such input to change many aspects of a rule definition, including for example its condition set or conditions therein, its exclusions, and its viewability-type identifier, as long as the changes result in a rule definition that will be recognized by publisher system 401. Similarly, rule generator 407 may be configured to utilize such input to create new rule definitions representing new viewable impression types, as long as the new rule definition will be recognized by publisher system 401. Rule generator 407 may allow changes to existing rule definitions and additions of new rule definitions to be applied at any time, without making changes to code of publisher system 401, as long as the rule definition will be recognized by publisher system 401. As described above, online advertising platform system 403 is configured to accept input from non-publisher parties, such as the advertiser whose online advertisement is being served or the online advertising platform operator who is serving the online advertisement, and to use that input to modify existing viewability rules or create new viewability rules. This provides the benefit that the publisher is no longer required to make changes to the code or rules of the publisher system when it becomes desirable to modify how viewable impressions are monitored.

As discussed above, that benefit occurs when any changed or new rules will be recognized by publisher system 401 without making changes to the code of publisher system 401. Rule generator 407 may ensure that publisher system 401 will recognize a rule definition by forming rules that are completely described by viewability rule primitives understood by publisher system 401. A viewability rule primitive is a field of a viewability rule and may have specific format and components that act as a framework for defining variations of a type of condition. For example, a viewability rule primitive for a requirement for minimum video duration may be ["d":x], where ["d"] indicates that the viewability rule primitive is establishing a requirement for the minimum video duration aspect, [:] indicates that a threshold value for that aspect will follow, and [x] is a variable threshold value that can be set for that aspect. Publisher system 401 may be pre-configured to understand a given viewability rule primitive by providing it with rule primitive implementation instructions 406 that recognize the combination of format and components specific to the viewability rule primitive and determine how to implement the recognized viewability rule primitive.

Rules array generator 408 may be used to specify which rules are added to a given viewability rules array. Rules array generator 408 may receive rules generated by viewability rule generator 407. Rules array generator 408 may be configured to receive, from an operator of online advertising platform system 403, input that specifies which rules will be included in particular viewability rules arrays to be served by online advertising platform system 403. Input from an operator of online advertising platform system 403 may for example be entered through one or more components of online advertising platform system 403. Alternatively or additionally, rules array generator 408 may be configured to receive input from an advertiser, for example through an advertiser device such as advertiser device 122. For example, an advertiser may use advertiser device 122 to communicate with account server 102 and/or advertising platform server 108 in order specify which rules will be included in particular viewability rules arrays to be served with online advertisements of the advertiser. Allowing advertisers an operators of online advertising platform system 403 to modify or add new viewability rules arrays adds additional flexibility to updating the manner of monitoring viewable impressions without the concern of dependency on an operator of publisher system 401 for implementing the updates.

Rules array server 409 provides generated rules arrays, for example viewability rules array 412, to publisher system 401. Rules array server 409 may be configured to receive an ad request, for example ad request 420, and provide a viewability rules array based upon an online advertisement that will be served in response thereto. For example, online advertising platform system 403 may determine which advertiser will have its online advertisement provided in response to ad request 420, based for example on which advertiser won an auction to place an online advertisement with online content 411, etc. Online advertising platform system 403 may further determine which of the determined advertiser's online advertisements will be provided in response to ad request 420, based for example on characteristics of user device 402 and online content 411, etc. Rules array server 409 may receive information about the online advertisement to be served in response to ad request 420, such as the type of online advertisement, the advertiser, etc. Rules array server 409 may select a viewability rules array to serve in response to ad request 420 based upon the received information about the online advertisement to be served in response to ad request 420. For example, rules array server 409 may search viewability rules arrays provided by rules array generator 408 for a viewability rules array specified to be served with the particular online advertisement of the advertiser to be served, or with online advertisements of the advertiser that are of the specific type of online advertisement to be served. The selection of a viewability rules array by rules array server 409 may be substantially executed in real-time, which may help to ensure that new or changed viewability rules or viewability rules arrays are rapidly implemented by publisher system 401. This may help to ensure that the addition of new viewability types and changes in existing viewability rules discussed above are implemented in a dynamic manner.

When publisher system 401 receives viewability rules array 412 in association with the provision of online advertisement 410 to user device 402, impression monitor server 422 may in response configure viewable impression monitor 423 for execution by and provision to user device 402. For example, impression monitor server 422 may configure viewable impression monitor 423 to cause user device 402 to collect a measurement set, determine whether the measurement set meets a condition set, and provide an indication of whether a viewable impression of the online advertisement 410 has occurred on user device 402. Viewable impression monitor 423 may be a processor-readable component of publisher system 401 that is configured to run on user device 402 in association with user application 424. For example, viewable impression monitor 423 may be script, code, or executable instructions integrated with online content 411 so viewable impression monitor 423 can be executed by user device 402 in association with execution of user application 424 by user device 402. Viewable impression monitor 423 may for example be implemented using JAVASCRIPT (e.g. if the user application is a browser) or using native IOS, ANDROID, C#, or JAVA code (e.g. if the user application is a mobile application). Configuring viewable impression monitor 423 may include selecting components, modifying selected components, and/or or generating new components. Impression monitor server 422 may configure viewable impression monitor 423 based on rule primitive implementation instructions 406 and viewability rules array 412. For example, configuring viewable impression monitor 423 may include using rule primitive implementation instructions 406 to translate viewability rules array 412 into a format that user device 402 can execute to determine whether one or more rules in viewability rules array 412 have been satisfied and to provide an indication of that determination. That translation may be further based upon aspects of online ad 410 and/or online content 411. Impression monitor server 422 may provide configured viewable impression monitor 423 integrated with online content 411 to user device 402 in response to online content request 421.

When viewable impression monitor 423 is executed by user device 402, it collects, according to viewabillity rules array 412, measurement set 413 based upon the display of online advertisement 410 by user device 402. A measurement set may generally include measured values for aspects of a display of an online advertisement by a user device, where the measured values correspond to aspects included in condition sets of a viewability rules array provided along with the online advertisement. An exemplary viewability rules array provided along with an online advertisement may include: (1) a first condition set with (i) a minimum duration of three seconds and (ii) a minimum percentage of pixels of 50%; and (2) a second condition set with (i) a minimum duration of two seconds, (ii) a minimum percentage of pixels of 50%, and (iii) a requirement for consecutive playback. An exemplary measurement set for display of that online advertisement may then include measured values for video playback duration, percentage of pixels displayed, and whether playback is consecutive. A measurement set may include, for each aspect of the measurement set, a plurality of values measured at a plurality of times. For example, a publisher system may repeatedly or continuously sample the percentage of pixels displayed as an online advertisement is displayed on a user device over time, and include each sampled value as part of the measurement set for the display of that online advertisement.

To configure measurer 404 to collect measurement set 413, impression monitor server 422 may access viewability rules array 412 and rule primitive implementation instructions 406 and configure measurer 404 to measure, for aspects that correspond to conditions included in at least one of the rules of viewability rules array 412, values of those aspects from display of online advertisement 410 by user device 402. For example, if viewability rules array 412 is the exemplary viewability rules array described in the preceding paragraph, impression monitor server 422 may access rule primitive implementation instructions 406, and based upon rule primitive implementation instructions 406: (i) recognize that rules array 412 includes conditions that are based on rule primitives for (a) a requirement for minimum video playback duration, (b) a requirement for a minimum percentage of pixels displayed, and (c) a requirement that playback is consecutive, and (ii) configure measurer 404 to measure the relevant aspects of the conditions of rules array 412 to form measurement set 413. Using viewabillty rules array 412 and rule primitive implementation instructions 406 in this manner helps to achieve the present disclosure's benefit of removing dependency on the publisher for updating the manner in which viewable impressions are monitored, by leveraging pre-existing aspects of publisher system 401, i.e. rule primitive implementation instructions 406, to implement the dynamically provided viewability rules array 412.

As viewable impression monitor 423 collects measurement set 413, it checks whether values of aspects in measurement set 413 meet the conditions included in the rules of viewability rules array 412. For example, determiner 405 may, throughout display of online advertisement 410 on user device 402, repeatedly or continuously compare each condition of a condition set of viewability rules array 412 with a value of a corresponding aspect of measurement set 413. When determiner 405 determines that a value of a corresponding aspect of measurement set 413 meets a condition of the condition set of viewability rules array 412, determiner 405 may update a status associated with that condition to reflect that the condition has been met, and continue to monitor values of the remaining aspects corresponding to the remaining unmet conditions of the condition set. Determiner 405 may perform these comparing and determining steps simultaneously for all condition sets included in viewability rules array 412. Determiner 405 may repeat these comparing and determining steps throughout the display of online advertisement 410.

When viewable impression monitor 423 determines that each condition in a condition set of a rule of viewability rules array 412 has been met, viewable impression monitor 423 determines that the condition set has been satisfied and that a viewable impression has occurred according to the rule. When viewable impression monitor 423 determines that a condition set of a rule of viewability rules array 412 has been satisfied, viewable impression monitor 423 provides a viewable impression indication. For example, determiner 405 may provide viewable impression indication 414 to online advertising platform system 403. A viewable impression indication may include a viewability-type identifier included in the rule of viewability rules array 412 according to which a viewable impression has occurred. Providing a viewable impression indication may include emitting a viewable impression beacon.

Figure 5:
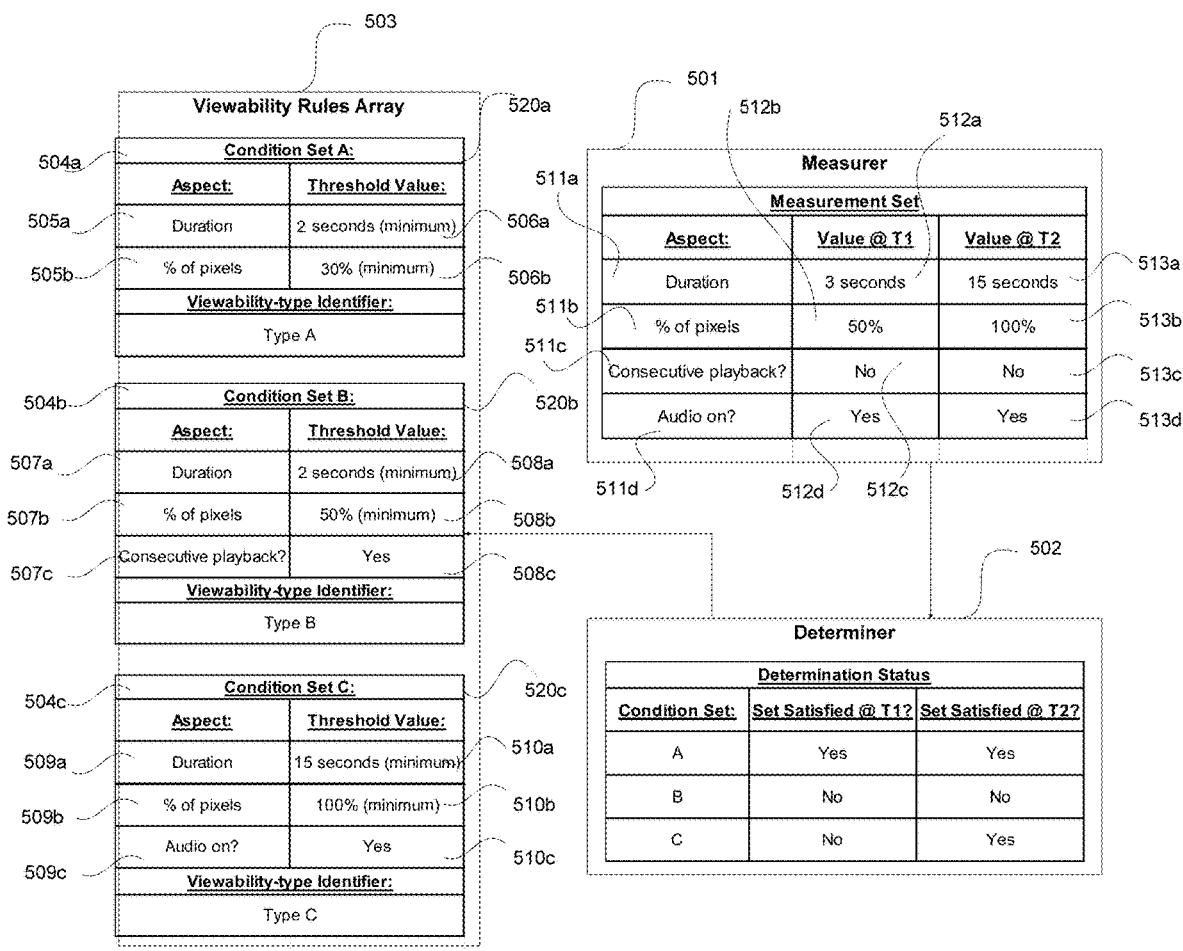
FIG. 5 is a schematic diagram illustrating an exemplary method and components for monitoring viewable impressions of online advertisements.

Operations of measurer 404 and determiner 405 are explained in further detail in conjunction with FIG. 5, which is a schematic diagram that illustrates an exemplary method of monitoring viewable impressions of an online advertisement. Measurer 501 is an exemplary implementation of measurer 404. Determiner 502 is an exemplary implementation of determiner 405. Viewability rules array 503 is an exemplary implementation of viewability rules array 412. A publisher system, for example publisher system 401, has received viewability rules array 503 in response to an online ad request, for example ad request 420. A user device, for example user device 402, is displaying an online ad, for example online advertisement 410, that was provided to the user device in response to the online ad request.

Viewability rules array 503 includes condition sets 504a, 504b, and 504c, which are respectively associated with three different rules 520a, 520b, and 520c of viewability rules array 503. Condition set 504a includes aspects 505a ("Duration") and 505b ("% of pixels"), and respective threshold values 506a ("2 seconds (minimum)") and 506b ("30% (minimum)"). Condition set 504b includes aspects 507a ("Duration"), 507b ("% of pixels"), and 507c ("Consecutive playback?"), and respective threshold values 508a ("2 seconds (minimum)"), 508b ("50% (minimum)"), and 508c ("Yes"). Condition set 504c includes aspects 509a ("Duration"), 509b ("% of pixels"), and 509c ("Audio on?"), and respective threshold values 510a ("15 seconds (minimum)"), 510b ("100% (minimum)"), and 510c ("Yes"). Viewability rules array 503 further includes viewability-type identifiers 505a ("Type A"), 505b ("Type B"), and 505c ("Type C"), which are respectively associated with rules 520a, 520b, and 520c.

Measurer 501 is collecting measurement set 503 and providing it to determiner 502 as it is collected, for example substantially in real-time. Measurement set 503 includes aspects 511a ("Duration"), 511b ("% of pixels"), 511c ("Consecutive playback?"), and 511d ("Audio on?"). Measurement set includes respective measured values 512a ("3 seconds"), 512b (50%"), 512c ("No"), and 512d ("Yes") measured at time T1. Measurement set 503 later includes respective measured values 513a ("15 seconds"), 513b ("100%"), 513c ("No"), and 513d ("Yes") measured at time T2. In connection with the present disclosure's description of the exemplary method of FIG. 5, phrases such as "at time T1" or "at time T2" may include an occurrence exactly at the referenced time, or at a time as practically close to the referenced time as possible given context and limitations in processing speed.

Determiner 502 is monitoring measurement set 503 during the display of the online advertisement by the user device, and repeatedly comparing each threshold value of each condition set to a value of a corresponding aspect of measurement set 503. For example, at time T1, determiner 502 compares threshold value 506a ("2 seconds (minimum)") of aspect 505a ("Duration") of condition set 504a with measured value 512a ("3 seconds") of corresponding aspect 511a ("Duration") of measurement set 503. Determiner 502 determines that measured value 512a ("3 seconds") meets threshold value 506a ("2 seconds (minimum)") because by exceeding threshold value 506a measured value 512a has attained the minimum requirement of threshold value 506a. In response, determiner 502 updates a status associated with aspect 505a and threshold value 506a to indicate that the condition defined thereby has been met. At time T1, determiner 502 further compares threshold value 506b ("50% (minimum)") of aspect 505b ("% of pixels") of condition set 504b with measured value 512b ("50%") of corresponding aspect 511b ("% of pixels") of measurement set 503. Determiner 502 determines that measured value 512a ("50%") meets threshold value 506a ("30% (minimum)") because by exceeding threshold value 506b measured value 512b has attained the minimum requirement of threshold value 506b. In response, determiner 502 updates a status associated with aspect 505b and threshold value 506b to indicate that the condition defined thereby has been met.

Because at time T1 determiner 502 has determined that all conditions of condition set 504a have been met, determiner 502 determines at time T1 that condition set 504a has been satisfied and a viewable impression according to rule 520a has occurred. In response to determiner 502 generates a viewable impression indication, for example viewable impression indication 414, by reading viewability-type identifier 505a ("Type A") from rule 520a and generating a viewable impression beacon including viewability-type identifier 505a. Determiner 502 then emits the generated viewable impression beacon that includes viewability-type identifier 505a to the online advertising platform system that provided viewability rules array 503 to publisher system 501. Generation and emission of the viewable impression beacon may occur immediately upon the determination by determiner 502 that a viewable impression according to rule 520a has occurred, which may be at time T1. Determiner 502 may stop comparing and determining operations for condition set 504a upon determining that a viewable impression according to rule 520a has occurred.

At time T1 determiner 502 is performing similar comparing and determining operations with condition sets 504b and 504c and measurement set 503 as it performed for condition set 504a and measurement set 503. However, at time T1, determiner 502 does not determine that each condition of condition sets 504b or 504c has been met. For example, at time T1 determiner 502 determines that threshold value 508c ("Yes") of aspect 507c ("Consecutive playback?") of condition set 504b is not met by measured value 512c ("No") of corresponding aspect 511c ("Consecutive playback?") of measurement set 503. Similarly, at time T1 determiner 502 determines that threshold value 510a ("15 seconds (minimum)") of aspect 509a ("Duration") of condition set 504c is not met by measured value 512a ("3 seconds") of corresponding aspect 511a ("Duration") of measurement set 503 and that threshold value 510b ("100% (minimum)") of aspect 509b ("% of pixels") of condition set 504c is not met by measured value 512b ("50%") of corresponding aspect 511b ("% of pixels") of measurement set 503.

Because at time T1 determiner 502 does not determine that each condition of condition sets 504b or 504c has been met, determiner 502 continues to perform similar comparing and determining operations at later time T2. For example, at time T2 determiner 502 determines that threshold value 508c ("Yes") of aspect 507c ("Consecutive playback?") of condition set 504b is not met by measured value 513c ("No") of corresponding aspect 511c ("Consecutive playback?") of measurement set 503. Thus again at time T2, determiner 502 does not determine that each condition of condition set 504b has been met.

However, at time T2 determiner 502 does determine that threshold value 510a ("15 seconds (minimum)") of aspect 509a ("Duration") of condition set 504c is met by measured value 513a ("15 seconds") of corresponding aspect 511a ("Duration") of measurement set 503, and determiner 502 does determine that threshold value 510b ("100% (minimum)") of aspect 509b ("% of pixels") of condition set 504c is met by measured value 513b ("100%") of corresponding aspect 511b ("% of pixels") of measurement set 503. Because determiner 502 had determined at time T1 that the other condition ("Audio on?", "Yes") of condition set 504c was met by the corresponding value of measurement set 503, determiner 502 determines at time T2 that a viewable impression according to rule 520c has occurred. Determiner 502 then generates a second viewable impression indication, for example another viewable impression indication 414, by reading viewability-type identifier 505c ("Type C") from rule 520c and generating a viewable impression beacon including viewability-type identifier 505c. Determiner 502 then emits the second generated viewable impression beacon that includes viewability-type identifier 505c to the online advertising platform system that provided viewability rules array 503 to publisher system 501. Generation and emission of the viewable impression beacon may occur immediately upon the determination by determiner 502 that a viewable impression according to rule 520c has occurred, which may be at time T2. Determiner 502 may stop comparing and determining operations for condition set 504c upon determining that a viewable impression according to rule 520c has occurred. Determiner 502 may continue performing similar comparing and determining operations with condition set 504b and measurement set 503 until either condition set 504b is determined to be satisfied or some predetermined time is reached, for example the end of the display of the online advertisement on the user device.

The foregoing detailed description of the exemplary method of FIG. 5 helps to illustrate an additional benefit of the present disclosure. By using a viewability rules array to dynamically configure publisher system 401, rather than individually delivered and processed rules, monitoring and reporting can be implemented in a more efficient manner. For example, because a plurality of rules can be delivered at the same time in a viewability rules array, publisher system 401 can consolidate its collection of measured values of aspects of the display to perform only a single measurement process for each distinct aspect across the different rules. However if individual rules were delivered separately, they might arrive at different times, such that measurement of a same aspect would need to be repeated starting at the different arrival times.

The above description of exemplary methods in connection with FIGS. 4 and 5 are provided to illustrate aspects of the present disclosure. However, additional or alternative aspects are also consistent with the present disclosure. For example, the above description of exemplary methods of FIG. 4 and FIG. 5 details implementations in which publisher system 401 configures viewable impression monitor 423 for execution by and provision to user device 402. Additionally or alternatively, in some embodiments consistent with the present disclosure, publisher system 401 may configure viewable impression monitor 423 for execution by publisher system 401. For example, in some embodiments publisher system 401 may configure viewable impression monitor 423 so that when it is executed by a server of publisher system 401, the server will perform the actions that are described above as being performed by user device 402 when it is running viewable impression monitor 423. Because viewable impression monitor 423 is configured by publisher system 401, it and its components, for example measurer 404 and determiner 405, may be considered to be components of publisher system 401 whether they are running on publisher system 401 or user device 402.

Furthermore, the above description of exemplary methods of FIG. 4 and FIG. 5 details implementations in which, when viewable impression monitor 423 runs on user device 402, viewable impression indication 414 is provided directly from user device 402 to online advertising platform 403. In some alternative embodiments, viewable impression monitor 423 running on user device 402 may first provide viewable impression indication 414 to publisher system 401, for example a server of publisher system 401, which may then provide viewable impression indication 414 to online advertising platform 403. Additionally, the above description of exemplary methods of FIG. 4 and FIG. 5 details implementations in which measurer 404 and determiner 405 are both provided to and run on user device 402. In some alternative embodiments, measurer 404 may be provided to and run on user device 402, and may provide measurement set 413 to determiner 405 which is running on publisher system 401.

Figure 7:
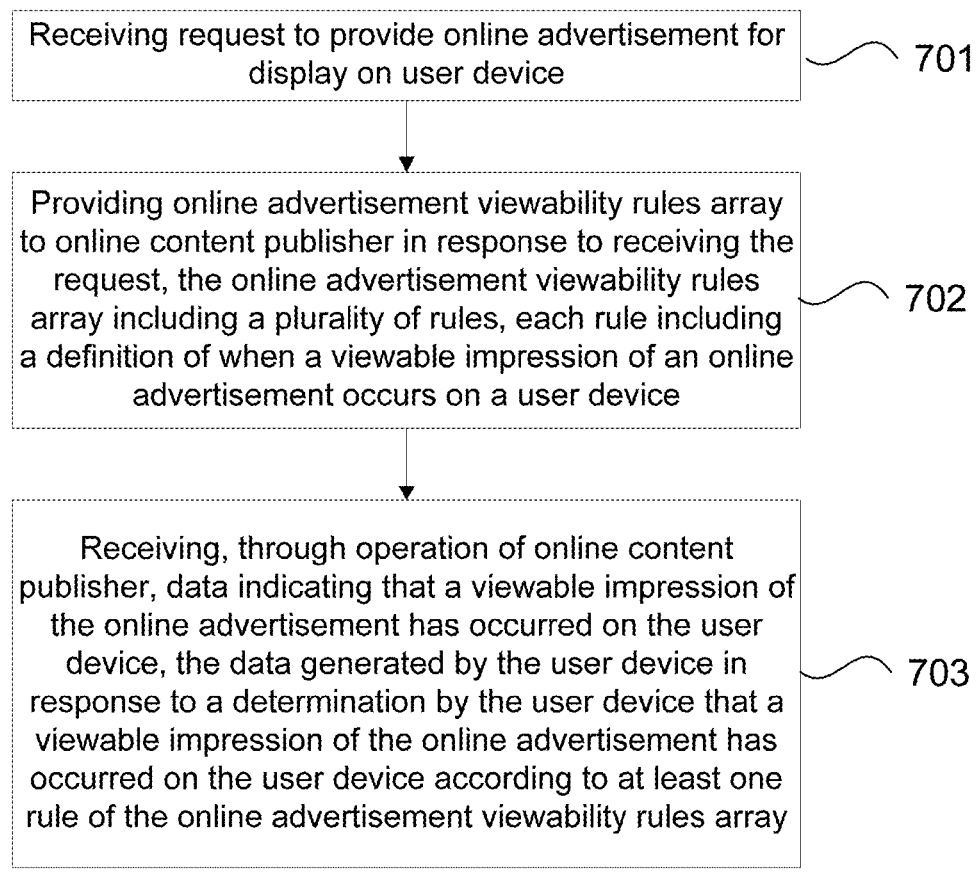
FIG. 7 is a flow chart illustrating an exemplary method of monitoring viewable impressions of online advertisements.

FIG. 7 is a flow chart illustrating an exemplary method of monitoring viewable impressions of online advertisements. The exemplary method of FIG. 7 may be executed by an online advertising platform system, or one or more components thereof, for example online advertising platform system 403, or one or more components thereof. In step 701, a request to provide an online advertisement for display on a user device is received. In step 702, an online advertisement viewability rules array is provided to an online content publisher in response to receiving the request. The online advertisement viewability rules array includes a plurality of rules, each rule including a definition of when a viewable impression of an online advertisement occurs on a user device. In step 703, data indicating that a viewable impression of the online advertisement has occurred on the user device is received from the online content publisher. The data is generated by the online content publisher in response to a determination by the online content publisher that a viewable impression of the online advertisement has occurred on the user device according to at least one rule of the online advertisement viewability rules array.

Figure 8:
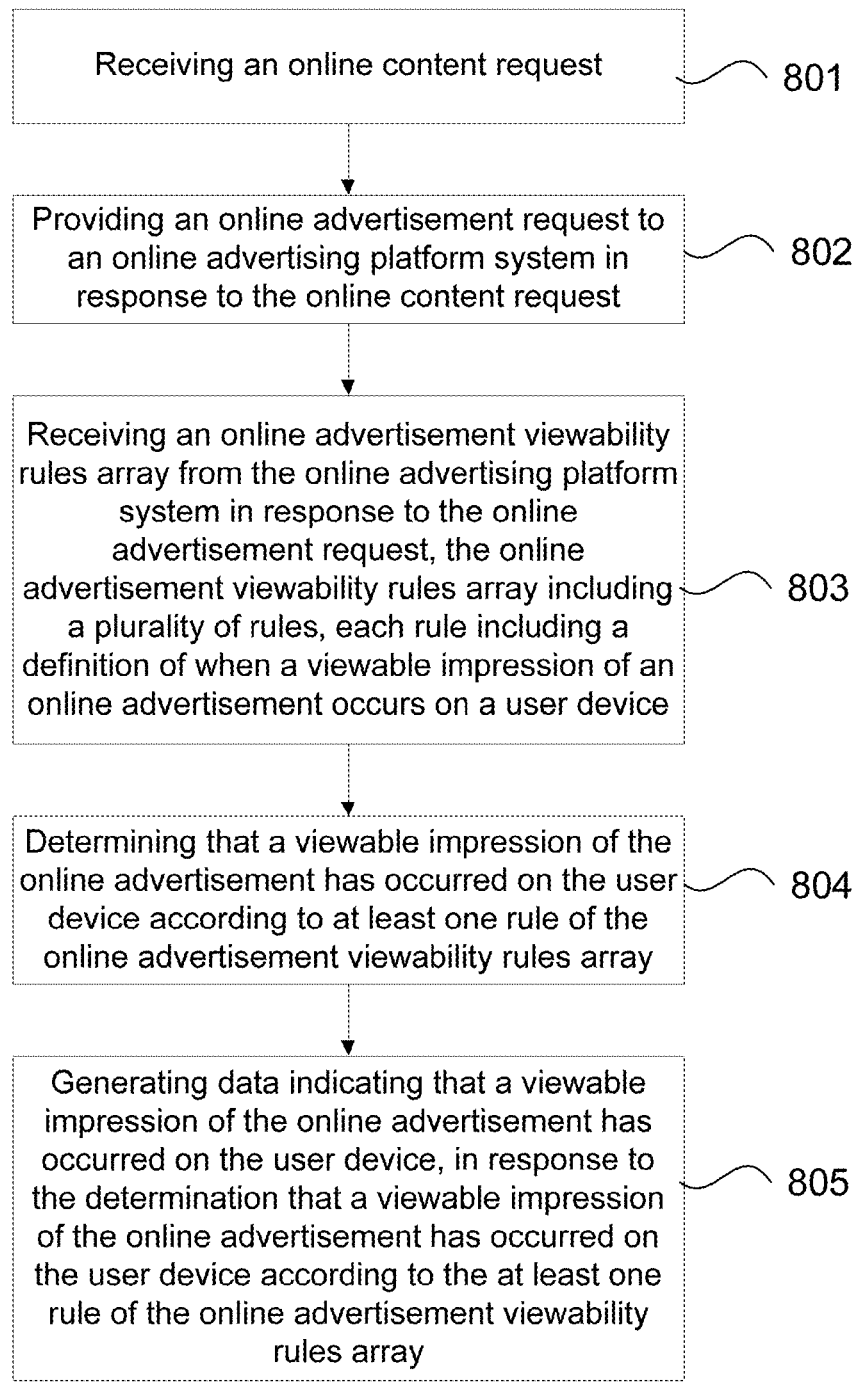
FIG. 8 is a flow chart illustrating an exemplary method of monitoring viewable impressions of online advertisements.

FIG. 8 is a flow chart illustrating an exemplary method of monitoring viewable impressions of online advertisements. The exemplary method of FIG. 8 may be executed by a publisher system, or one or more components thereof, for example publisher system 401, or one or more components thereof, including for example impression monitor server 422 and viewable impression monitor 423 running on user device 402 or publisher system 401. In step 801, an online content request is received. In step 802, an online advertisement request is provided to an online advertising platform system in response to the online content request. In step 803, an online advertisement viewability rules array is received from the online advertising platform system in response to the online advertisement request. The online advertisement viewability rules array includes a plurality of rules, each rule including a definition of when a viewable impression of an online advertisement occurs on a user device. In step 804, it is determined that a viewable impression of the online advertisement has occurred on the user device according to at least one rule of the online advertisement viewability rules array. Step 804 may for example be conducted by a viewable impression monitor sent by the publisher system to a user device and executed on the user device, or by a viewable impression monitor executed on the publisher system. In step 805, data indicating that a viewable impression of the online advertisement has occurred on the user device is generated in response to the determination that a viewable impression of the online advertisement has occurred on the user device according to the at least one rule of the online advertisement viewability rules array. Step 805 may for example be conducted by a viewable impression monitor sent by the publisher system to a user device and executed on the user device, or by a viewable impression monitor executed on the publisher system.

As shown in the above systems and methods, the present disclosure provides one or more solutions to one or more problems presented by current technologies for monitoring viewable impressions. Aspects of the present disclosure receive a request to provide an online advertisement for display on a user device, provide an online advertisement viewability rules array to an online content publisher system in response to receiving the request, and receive, through operation of the online content publisher system, data indicating that a viewable impression of the online advertisement has occurred on the user device. The online advertisement viewability rules array includes a plurality of rules, wherein each rule of the plurality of rules includes a definition of when a viewable impression of an online advertisement occurs on a user device. The data is generated by a processor of the user device in response to a determination by the processor of the user device that a viewable impression of the online advertisement has occurred on the user device according to at least one rule of the online advertisement viewability rules array. These aspects improve upon current technologies, for example because they allow for parties other than the operator of the online content publisher system, for example an operator of the online advertising platform system providing the online advertisement, or an advertiser whose advertisement is being provided, to dynamically add new viewability types and dynamically change viewability rules, without the publisher needing to make changes to the code or rules on the publisher system that is currently being implemented by the publisher to monitor and report viewable impressions.

While exemplary embodiments have been particularly shown and described with reference to FIGS. 1-8, it will be understood by one of ordinary skill in the art that various changes in form and details may be made therein without departing from the spirit and scope of exemplary embodiments, as defined by the following claims. The exemplary embodiments, therefore, are provided merely to be illustrative and subject matter that is covered or claimed is intended to be construed as not being limited to any example embodiments set forth herein. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The foregoing detailed description is, therefore, not intended to be taken in a limiting sense.

I claim:

1. A computer-implemented method to monitor viewable impressions of online advertisements, the method comprising:

in a server of an online advertising platform system:
receiving a request to provide an online advertisement for display on a user device;
responsive to receiving the request to provide the online advertisement, providing, via a network connection, an online advertisement viewability rules array to an online content publisher system, the online advertisement viewability rules array comprising a plurality of rules, wherein each rule of the plurality of rules comprises a definition of when at least one viewable impression of at least one online advertisement occurs on the user device and the definition comprises a condition set indicative of the at least one viewable impression of the at least one online advertisement occurring on the user device; and
receiving, through operation of the online content publisher system, data indicating that a viewable impression of the online advertisement has occurred on the user device;
wherein the data is generated by a processor of the user device in response to a determination by the processor of the user device that the viewable impression of the online advertisement has occurred on the user device according to at least one rule of the online advertisement viewability rules array, wherein the determination is based upon a determination that a measurement set satisfies at least one condition set of the at least one rule, wherein the measurement set is based upon a display of the online advertisement on the user device;
wherein at least some of at least one of the receiving the request, the providing the online advertisement viewability rules array or the receiving the data allows at least one of the online advertising platform system or an advertiser to at least one of dynamically add a new viewability type or dynamically change a viewability rule.

2. The computer-implemented method of claim 1, wherein at least some of at least one of the receiving the request, the providing the online advertisement viewability rules array or the receiving the data allows at least one of the online advertising platform system or the advertiser to at least one of dynamically add the new viewability type or dynamically change the viewability rule without the online content publisher system needing to modify at least one of code of the online content publisher system or one or more rules on the online content publisher system.

3. The computer-implemented method of claim 1, wherein:
   the measurement set comprises at least one measured value of at least one aspect of the display of the online advertisement on the user device;
   the at least one measured value is collected by the processor of the user device; and
   each condition set of the online advertisement viewability rules array comprises at least one threshold value for an aspect of a display of one or more online advertisements on one or more user devices.

4. The computer-implemented method of claim 3, wherein the processor of the user device is configured to:
   during the display of the online advertisement on the user device, continuously compare each condition set of the online advertisement viewability rules array with the measurement set; and
   when each threshold value of a condition set of a rule of the online advertisement viewability rules array is determined to be met by a measured value of a corresponding aspect of the measurement set, determine that the measurement set satisfies the condition set of the rule.

5. The computer-implemented method of claim 1, wherein the online advertisement viewability rules array further comprises, for each rule of the online advertisement viewability rules array, an associated identifier that describes a predetermined type of viewable impression that occurs when a display of one or more online advertisements on one or more user devices matches a definition of when a second viewable impression of a second online advertisement occurs on a second user device according to the rule.

6. The computer-implemented method of claim 5, wherein:
   the at least one rule comprises a first rule;
   the display of the online advertisement on the user device is determined by the processor of the user device to match a first definition of when a first viewable impression of a first online advertisement occurs on a first user device according to the first rule; and
   the data comprises a first viewable-impression beacon provided by the processor of the user device, the first viewable-impression beacon comprising a first identifier that describes a first predetermined type of viewable impression that occurs when a display of an online advertisement on a user device matches the first definition according to the first rule.

7. The computer-implemented method of claim 6, wherein:
   the at least one rule further comprises a second rule;
   the display of the online advertisement on the user device is determined by the processor of the user device to match a second definition of when a third viewable impression of a third online advertisement occurs on a third user device according to the second rule; and
   the data comprises a second viewable-impression beacon provided by the processor of the user device, the second viewable-impression beacon comprising a second identifier that describes a second predetermined type of viewable impression that occurs when a display of an online advertisement on a user device matches the second definition according to the second rule.

8. A non-transitory processor-readable medium storing instructions to monitor viewable impressions of online advertisements, the instructions configured to, when executed by a processor of a server of an online advertising platform system, cause the processor of the server of the online advertising platform system to perform operations of:
   receiving a request to provide an online advertisement for display on a user device;
   responsive to receiving the request to provide the online advertisement, providing, via a network connection, an online advertisement viewability rules array to an online content publisher system, the online advertisement viewability rules array comprising a plurality of rules, wherein each rule of the plurality of rules comprises a definition of when at least one viewable impression of at least one online advertisement occurs on the user device and the definition comprises a condition set indicative of the at least one viewable impression of the at least one online advertisement occurring on the user device; and
   receiving, through operation of the online content publisher system, data indicating that a viewable impression of the online advertisement has occurred on the user device;
   wherein the data is generated by a second processor of the user device in response to a determination by the user device that the viewable impression of the online advertisement has occurred on the user device according to at least one rule of the online advertisement viewability rules array, wherein the determination is based upon a determination that a measurement set satisfies at least one condition set of the at least one rule, wherein the measurement set is based upon a display of the online advertisement on the user device.

9. The non-transitory processor-readable medium of claim 8, wherein at least some of at least one of the receiving the request, the providing the online advertisement viewability rules array or the receiving the data allows at least one of the online advertising platform system or an advertiser to at least one of dynamically add a new viewability type or dynamically change a viewability rule.

10. The non-transitory processor-readable medium of claim 8, wherein:
    the measurement set comprises at least one measured value of at least one aspect of the display of the online advertisement on the user device;
    the at least one measured value is collected by the processor of the user device; and
    each condition set of the online advertisement viewability rules array comprises at least one threshold value for an aspect of a display of one or more online advertisements on one or more user devices.

11. The non-transitory processor-readable medium of claim 10, wherein the processor of the user device is configured to:
    during the display of the online advertisement on the user device, continuously compare each condition set of the online advertisement viewability rules array with the measurement set; and
    when each threshold value of a condition set of a rule of the online advertisement viewability rules array is determined to be met by a measured value of a corresponding aspect of the measurement set, determine that the measurement set satisfies the condition set of the rule.

12. The non-transitory processor-readable medium of claim 8, wherein the online advertisement viewability rules array further comprises, for each rule of the online advertisement viewability rules array, an associated identifier that describes a predetermined type of viewable impression that occurs when a display of one or more online advertisements on one or more user devices matches a definition of when a second viewable impression of a second online advertisement occurs on a second user device according to the rule.

13. The non-transitory processor-readable medium of claim 9, wherein:
   the at least one rule comprises a first rule;
   the display of the online advertisement on the user device is determined by the processor of the user device to match a first definition of when a first viewable impression of a first online advertisement occurs on a first user device according to the first rule; and
   the data comprises a first viewable-impression beacon provided by the processor of the user device, the first viewable-impression beacon comprising a first identifier that describes a first predetermined type of viewable impression that occurs when a display of an online advertisement on a user device matches the first definition according to the first rule.

14. The non-transitory processor-readable medium of claim 13, wherein:
   the at least one rule further comprises a second rule;
   the display of the online advertisement on the user device is determined by the processor of the user device to match a second definition of when a third viewable impression of a third online advertisement occurs on a third user device according to the second rule; and
   the data comprises a second viewable-impression beacon provided by the processor of the user device, the second viewable-impression beacon comprising a second identifier that describes a second predetermined type of viewable impression that occurs when a display of an online advertisement on a user device matches the second definition according to the second rule.

15. An online advertising platform server to monitor viewable impressions of online advertisements, the online advertising platform server comprising:
   a processor-readable medium storing instructions to monitor online advertisement viewability; and
   a processor in operative communication with the processor-readable medium and configured to execute the instructions to perform operations of:
      receiving a request to provide an online advertisement for display on a user device;
      responsive to receiving the request to provide the online advertisement, providing an online advertisement viewability rules array to an online content publisher system, the online advertisement viewability rules array comprising a plurality of rules, wherein each rule of the plurality of rules comprises a definition of when at least one viewable impression of at least one online advertisement occurs on the user device; and
      receiving, through operation of the online content publisher system, data indicating that a viewable impression of the online advertisement has occurred on the user device;
   wherein the data is generated by a second processor of the user device in response to a determination by the processor of the user device that the viewable impression of the online advertisement has occurred on the user device according to at least one rule of the online advertisement viewability rules array;
   wherein at least some of at least one of the receiving the request, the providing the online advertisement viewability rules array or the receiving the data allows at least one of an online advertising platform system or an advertiser to at least one of dynamically add a new viewability type or dynamically change a viewability rule.

16. The online advertising platform server of claim 15, wherein at least some of at least one of the receiving the request, the providing the online advertisement viewability rules array or the receiving the data allows at least one of the online advertising platform system or the advertiser to at least one of dynamically add the new viewability type or dynamically change the viewability rule without the online content publisher system needing to modify at least one of code of the online content publisher system or one or more rules on the online content publisher system.

17. The online advertising platform server of claim 15, wherein:
   a measurement set comprises at least one measured value of at least one aspect of the display of the online advertisement on the user device;
   the at least one measured value is collected by the processor of the user device; and
   each condition set of the online advertisement viewability rules array comprises at least one threshold value for an aspect of a display of one or more online advertisements on one or more user devices.

18. The online advertising platform server of claim 17, wherein the processor of the user device is configured to:
   during the display of the online advertisement on the user device, continuously compare each condition set of the online advertisement viewability rules array with the measurement set; and
   when each threshold value of a condition set of a rule of the online advertisement viewability rules array is determined to be met by a measured value of a corresponding aspect of the measurement set, determine that the measurement set satisfies the condition set of the rule.

19. The online advertising platform server of claim 15, wherein the online advertisement viewability rules array further comprises, for each rule of the online advertisement viewability rules array, an associated identifier that describes a predetermined type of viewable impression that occurs when a display of one or more online advertisements on one or more user devices matches a definition of when a second viewable impression of a second online advertisement occurs on a second user device according to the rule.

20. The online advertising platform server of claim 19, wherein:
   the at least one rule comprises a first rule;
   the display of the online advertisement on the user device is determined by the processor of the user device to match a first definition of when a first viewable impression of a first online advertisement occurs on a first user device according to the first rule; and
   the data comprises a first viewable-impression beacon provided by the processor of the user device, the first viewable-impression beacon comprising a first identifier that describes a first predetermined type of viewable impression that occurs when a display of an online advertisement on a user device matches the first definition according to the first rule.

\* \* \* \* \*